(No Model.)
J. T. BURR.
DIFFERENTIAL SCREW.
No. 260,366. Patented July 4, 1882.
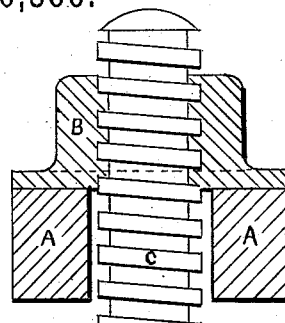
FIG. 1.
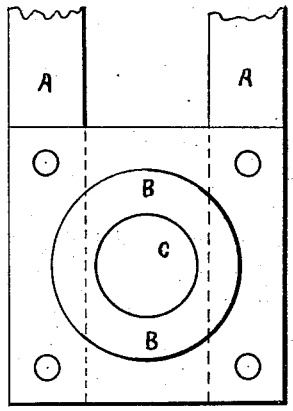
FIG. 2.
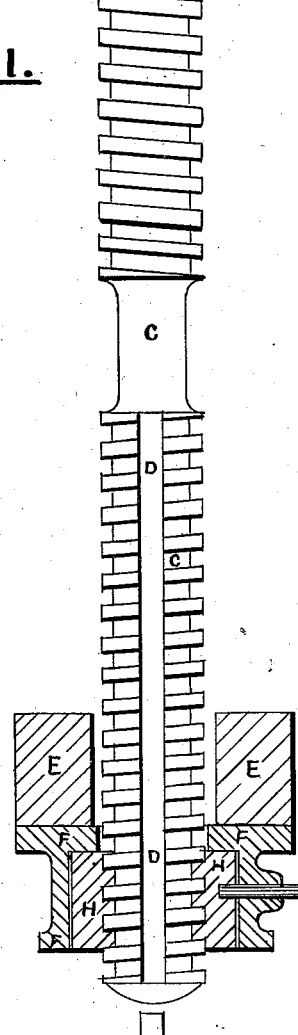
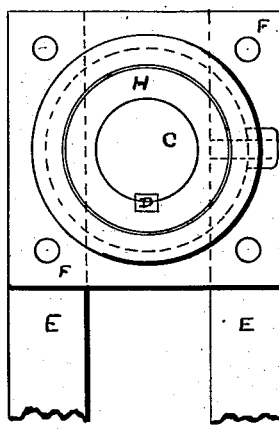
FIG. 3.
FIG. 4.   FIG. 5.
Witnesses
John G. Battelle.
Elwyn A. Mallory.
Inventor
John T. Burr.
N. PETERS. Photo-Lithographer. Washington. D. C.

UNITED STATES PATENT OFFICE.

JOHN T. BURR, OF STAMFORD, CONNECTICUT.

DIFFERENTIAL SCREW.

SPECIFICATION forming part of Letters Patent No. 260,366, dated July 4, 1882.

Application filed December 12, 1881. (No model.)

*To all whom it may concern:*

Be it known that I, JOHN T. BURR, of Stamford, county of Fairfield, State of Connecticut, have invented a new and Improved Differential Screw, of which the following is a specification.

My invention relates to improvements in that class of screws which are threaded on each end, and have generally a right-handed thread on one end and a left-handed thread on the other. These screws are usually used for compressing light substances, as cotton, hay, &c. During the earlier part of the movement of such screws the resistance is slight, and the movement of the pressing-faces should be rapid. Later the resistance increases, and the speed should decrease with relative increase of power. To accomplish this result is the object of my invention.

In the accompanying drawings, Figure 1 is a vertical section through the screw. Fig. 2 is a plan of the upper end of the screw and the nut on that end. Fig. 3 is a plan of the lower end of the screw and the nut on that end. Fig. 4 is a front elevation of key or feather, and Fig. 5 is a side elevation of the same.

Similar letters refer to similar parts in each of the views.

C is a screw threaded on the upper end with a left-handed thread and on the lower end with right-handed thread. Throughout the whole length of the lower screw a keyway, D, of proper size is placed.

A A are the upper pressing-faces. B is a nut rigidly fastened to these upper pressing-faces, and properly threaded to take the upper screw. This is of ordinary construction.

E E are the lower pressing-faces, and to them is fastened the nut-bearing F. Within this, free to rotate, as shown, is the nut H, screwed to fit the lower screw. This nut has a keyway, D, corresponding in size with the keyway in the screw. During each rotation of the screw this keyway comes opposite to and in line with keyway in the screw.

Through the side of the nut-bearing F a pin, K, is placed, and a recess is provided in the nut H to take said pin, and thus lock the nut to the nut-bearing F.

The key L, Figs. 4 and 5, is of such size as to fit the space formed when the keyway in the nut comes coincident with the keyway in the screw. It is gibbed to allow of its easy extraction.

The operation of my invention is as follows: During the early part of the screwing or pressing process the key L is removed and the pin K is pushed into the nut H. Under these circumstances the provinces of the nuts B and H are similar and normal. The screw is rotated and the pressing-faces approach with a speed relative to the rotation of the screw of twice the pitch of the thread. This movement continues until the resistance is greater than the propelling force. Then the pin K is withdrawn and the key L inserted into the coincident keyways D, and the nut H, ceasing to be any part of the screwing mechanism, rotates with the the screw C. The pressing operation goes on with the value of the power doubled (assuming that the threads of the upper and lower screws are of the same pitch) at the expense, however, of a decrease of speed by one-half.

It is not my intention to confine this invention to screws for presses for hay, cotton, &c. It may be used in many other places—*e. g.*, jacks for raising heavy weights, &c.

What I claim, and desire to secure by Letters Patent of the United States, is—

1. A screw, C, threaded on each end, in combination with a nut, H, with its locking-pin K and gib or key L, all in the manner and for the purposes specified.

2. In combination with a screw threaded on each end, a nut with locking devices, by operating which the said nut is rendered, as desired, a nut proper or a simple head to the screw.

JOHN T. BURR.

Witnesses:
JOHN G. BATTELLE,
ELWYN A. MALLORY.